(12) United States Patent
Guo

(10) Patent No.: US 10,408,113 B2
(45) Date of Patent: Sep. 10, 2019

(54) SELF CORRECTION FOR EXHAUST GAS TEMPERATURE SENSOR SYSTEM

(71) Applicant: Nissan North America, Inc., Franklin, TN (US)

(72) Inventor: Yichao Guo, Rochester Hills, MI (US)

(73) Assignee: Nissan North America, Inc., Franklin, TN (US)

(*) Notice: Subject to any disclaimer, the term of this patent is extended or adjusted under 35 U.S.C. 154(b) by 148 days.

(21) Appl. No.: 15/459,972

(22) Filed: Mar. 15, 2017

(65) Prior Publication Data
US 2018/0266299 A1 Sep. 20, 2018

(51) Int. Cl.
*F01N 11/00* (2006.01)
*F01N 9/00* (2006.01)
*F01N 13/00* (2010.01)
*F01N 13/10* (2010.01)
*F01N 3/10* (2006.01)

(52) U.S. Cl.
CPC ............ *F01N 11/002* (2013.01); *F01N 9/007* (2013.01); *F01N 13/008* (2013.01); *F01N 13/10* (2013.01); *F01N 3/10* (2013.01); *F01N 2560/06* (2013.01); *F01N 2560/14* (2013.01); *F01N 2900/0416* (2013.01); *F01N 2900/0422* (2013.01); *F01N 2900/1404* (2013.01); *Y02A 50/2322* (2018.01); *Y02T 10/47* (2013.01)

(58) Field of Classification Search
CPC ...... F01N 11/002; F01N 9/007; F01N 13/008; F01N 13/10; F01N 2560/06; F01N 2560/14; F01N 2900/0416; F01N 2900/0422; F01N 2900/1404; F01N 3/10; Y02A 50/2322; Y02T 10/47

USPC .......................................................... 60/276
See application file for complete search history.

(56) References Cited

U.S. PATENT DOCUMENTS

| | | | |
|---|---|---|---|
| 5,388,454 A * | 2/1995 | Kuroda | F02D 41/22 73/114.75 |
| 7,418,322 B2 | 8/2008 | Kariya et al. | |
| 7,588,368 B2 * | 9/2009 | Hagen | F02D 41/1445 374/135 |
| 8,428,853 B2 * | 4/2013 | Nakashima | F02D 41/062 701/107 |

(Continued)

FOREIGN PATENT DOCUMENTS

| | | |
|---|---|---|
| JP | 4503498 B2 | 7/2010 |
| WO | 2013179701 A1 | 12/2013 |

*Primary Examiner* — Thai Ba Trieu
*Assistant Examiner* — Diem T Tran
(74) *Attorney, Agent, or Firm* — Global IP Counselors, LLP

(57) ABSTRACT

A self-correcting exhaust gas temperature sensor system includes an exhaust gas temperature sensor, a controller and a storage device. The exhaust gas temperature sensor is configured to be disposed in an exhaust manifold of a vehicle. The controller is programmed to determine a reading of the exhaust gas temperature sensor at a predetermined time, determine a comparative temperature value, calculate an offset difference between the comparative temperature value and the reading of the exhaust gas temperature sensor, and based on the offset difference relative of the comparative temperature value, replace an exhaust gas temperature sensor offset value with the offset difference or with a threshold value. The storage device is configured to store the offset difference or the threshold value.

17 Claims, 6 Drawing Sheets

(56) References Cited

U.S. PATENT DOCUMENTS 8,549,902 B2 * 10/2013 Matsunaga ......... F02D 41/1446
73/114.69
2013/0269662 A1 10/2013 Kuhn et al.

* cited by examiner

SELF CORRECTION FOR EXHAUST GAS TEMPERATURE SENSOR SYSTEM

BACKGROUND

Field of the Invention

The present invention generally relates to an exhaust gas temperature sensor system. More specifically, the present invention relates to a self-correcting exhaust gas temperature sensor system that can extend the useful life of the exhaust gas temperature sensor by making full use of the sensor's engineering range.

Background Information

Exhaust gas temperature sensors are used to monitor the exhaust gas temperature of an internal combustion engine due to emission control and catalyst protection purposes. By monitoring exhaust gas temperature, the vehicle computer system can accurately sense the vehicle's exhaust gas temperature for better air-fuel ratio control. Conventional exhaust-gas temperature sensing systems can include an exhaust-gas temperature sensor disposed in an exhaust-gas passage of an internal combustion engine, an exhaust-gas temperature measurement unit which obtains an exhaust-gas temperature measurement value on the basis of an output value from the exhaust-gas temperature sensor, and a diagnosis unit which compares an exhaust-gas temperature estimation value to the exhaust-gas temperature measurement value to diagnose exhaust-gas-temperature sensor failure. The diagnosis unit diagnoses exhaust-gas-temperature sensor failure when the internal combustion engine is in an operating state, and sets the associated fault and diagnostic trouble codes (DTC).

SUMMARY

It has been discovered that conventional exhaust-gas temperature sensor systems are not capable of self-correction, and the model to estimate the exhaust-gas temperature could have a wide error range (e.g., +/−250 Deg C.) in certain transient engine operating conditions.

In view of the state of the known technology, one aspect of the present disclosure is to provide an exhaust-gas temperature sensor system that can extend the useful life of the exhaust-gas temperature sensor. The self-correcting exhaust gas temperature sensor system comprises an exhaust gas temperature sensor, a controller and a storage device. The exhaust gas temperature sensor is configured to be disposed in an exhaust manifold of a vehicle. The controller is programmed to determine a reading of the exhaust gas temperature sensor at a predetermined time, determine a comparative temperature value, calculate an offset difference between the comparative temperature value and the reading of the exhaust gas temperature sensor, and based on the offset difference relative of the comparative temperature value, replace an exhaust gas temperature sensor offset value with the offset difference or with a threshold value. The storage device is configured to store the offset difference or the threshold value.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
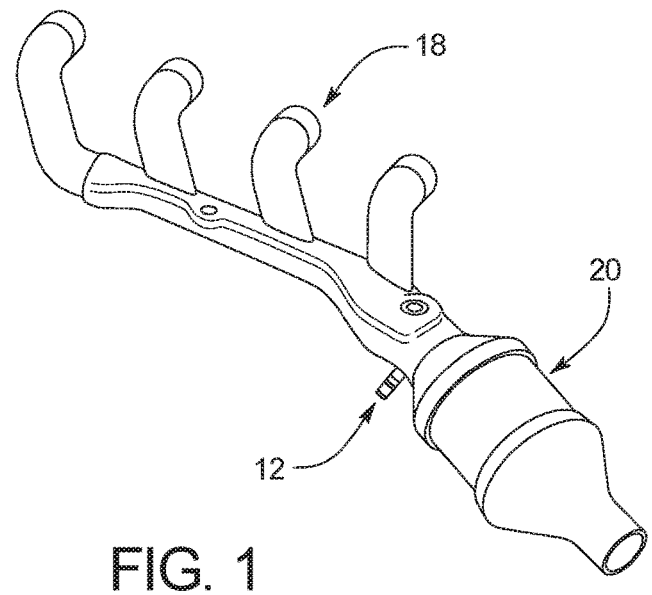
FIG. 1 is a top perspective view of an exhaust manifold that includes an exhaust gas temperature sensor according to an embodiment of the present invention.
Figure 2:
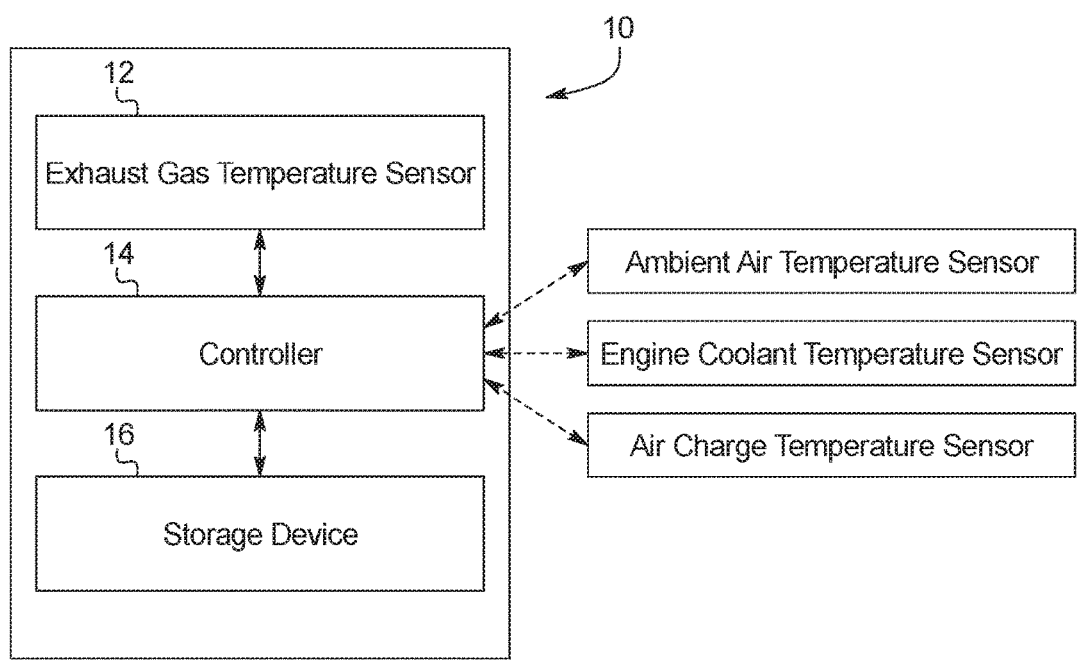
FIG. 2 is a schematic view of an exhaust gas temperature sensor system according to an embodiment of the present invention.

Referring initially to FIGS. 1 and 2, an exhaust gas temperature sensor system 10 is illustrated in accordance with a first embodiment. The exhaust gas temperature sensor system 10 is a self-correcting exhaust gas temperature sensor system that includes an exhaust gas temperature sensor 12, a controller 14 and a storage device 16.

The exhaust gas temperature sensor 12 can be disposed in the exhaust manifold 18 or between the exhaust manifold 18 and the catalyst 20 (or catalytic converter) or in any other suitable position along the exhaust system. In one embodiment, the exhaust gas temperature sensor 12 is located at one end of the exhaust manifold 18, immediately before the catalyst 20. The exhaust gas temperature sensor 12 can be used for fuel enrichment control to reduce CO emission in high speed/load condition while protecting catalyst thermal deterioration. As one of ordinary skill would understand, by determining or sensing the temperature of the exhaust gas, the vehicle is capable of determining CO emission and thus controlling fuel enrichment to reduce the CO emission.

The exhaust gas temperature sensor 12 can be a full-range sensor capable of sensing a temperature range that covers an entire range that the exhaust temperature could experience. For example, the full-range exhaust gas temperature sensor 12 can be capable of sensing a temperature from about −50 Deg C. to about 1050 Deg C. However, the exhaust gas temperature sensor 12 can be a partial-range sensor capable of sensing a temperature range that covers only part of the range that the exhaust temperature could experience. Partial-range sensors generally only cover a range that occurs when the exhaust path is heated up. For example, the partial-range exhaust gas temperature sensor 12 can be capable of sensing a temperature from about 70 Deg C. to about 1050. Deg C.

As one of ordinary skill would understand, the exhaust manifold 18 collects the exhaust gases from multiple cylinders into one pipe. Exhaust manifolds are generally cast iron or stainless steel units which collect engine exhaust gas from multiple cylinders and deliver it to the exhaust pipe.

The catalyst 20 (or catalytic converter) or is an emissions control device that converts toxic gases and pollutants in exhaust gas to less toxic pollutants by catalyzing a redox reaction (an oxidation and a reduction reaction).

The controller 14 can be an electronic control module or unit or any other suitable control device that is capable of carrying out the algorithms and decisions discussed herein. The controller 14 preferably includes a microcomputer with a control program that controls the exhaust gas temperature sensor system 10 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control the exhaust gas temperature sensor system 10. The memory circuit stores processing results and control programs such as ones for the exhaust gas temperature sensor system 10 operation that are run by the processor circuit. The controller 14 is operatively coupled to the exhaust gas temperature sensor 12 in a conventional manner. The internal RAM of the controller 14 stores statuses of operational flags and various control data. The controller 14 is capable of selectively controlling any of the components of the exhaust gas temperature sensor system 10 in accordance with the control program. It will be apparent to those skilled in the art from this disclosure that the precise structure and algorithms for the controller 14 can be any combination of hardware and software that will carry out the functions of the present invention.

In one embodiment, the exhaust gas temperature sensor system 10 is configured to perform self-correction of the exhaust gas temperature sensor 12 and perform a rationality check. As one of ordinary skill would understand, when the engine is off, there is no combustion in the cylinder and no airflow in the exhaust path. The thermal conditions are stable and predictable, and the noise factors that could potentially impact the exhaust gas temperature sensor 12 reading are minimized.

Traditionally, conventional exhaust gas temperature sensors perform mutual comparisons among temperature sensors at key-on after a long soak time (i.e., the time in which the engine is off). Such strategy, however, has several drawbacks. First, this process only applies to full-range temperature sensors, since a long soak time will cause all the temperature sensors to read close to or at the ambient temperature. Accordingly, partial-range temperature sensors with a low-end cutoff temperature being well above normal ambient temperature range (e.g., 70 Deg. C) cannot be compared with other temperature sensors. Second, these types of algorithms require a long soak time, which has a negative impact on the in-use monitor performance ratio. Third, even if the exhaust gas temperature sensor 12 is a full-range sensor, such detection only ensures that the sensor has not drifted around the ambient temperature range.

Figure 3:
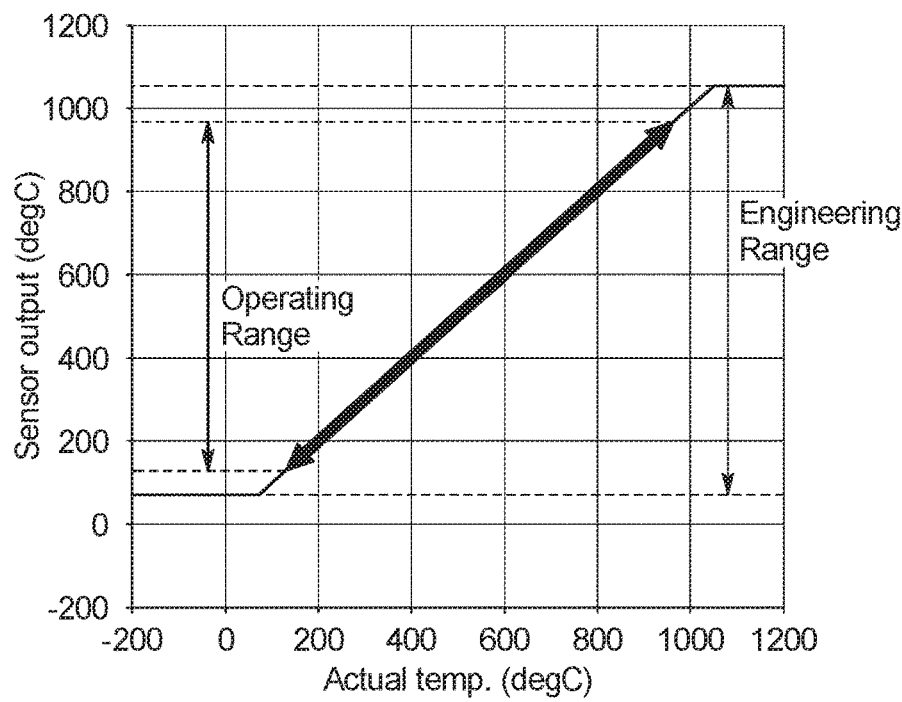
FIG. 3 is a graph illustrating the operating range and the engineering range of the exhaust gas temperature sensor of FIG. 1.

As shown in FIG. 3, exhaust gas temperature sensors generally have an engineering range, which refers to the full linear temperature range that the sensor is capable of sensing. For example, the exhaust gas temperature sensor 12 can have an engineering range of about 50 degrees C. to about 1050 degrees C. However, the exhaust gas temperature sensor 12 may have an operating range that is a smaller range set within the engineering range. That is, the operating range generally refers to the temperature range that the sensor is designed to work in. Typically, the operating range is a subset of the full engineering range of the sensor. In this example, the operating range is between about 150 degrees C. and 975 degrees C.

Figure 4:
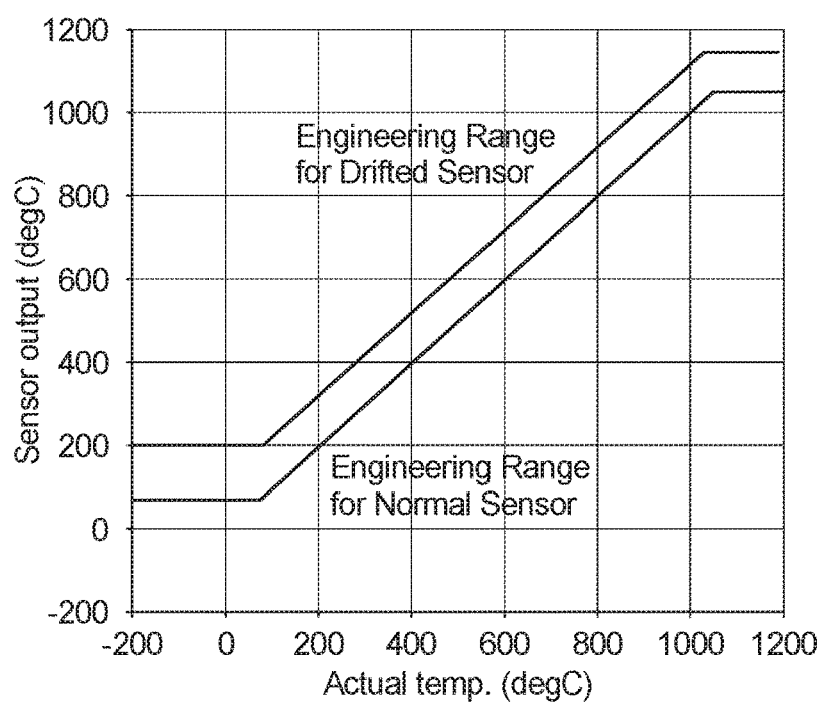
FIG. 4 is a graph illustrating the engineering range of a drifted exhaust gas temperature sensor.

However, as shown in FIG. 4, in some instances the exhaust gas temperature sensor 12 can deteriorate, and the sensor output can drift. That is, sensor output in the engineering range can drift from the actual temperature. In such an instance, the exhaust gas temperature sensor output is either lower or higher than the actual temperature. For example, if the actual temperature is 400 degrees C., the exhaust gas temperature sensor 12 may output a temperature of about 500 degrees C. Generally, even when the exhaust gas temperature sensor 12 has drifted, the exhaust gas temperature sensor 12 still retains the linear relationship over part of the engineering range, but the valid linear range can vary.

Figure 5:
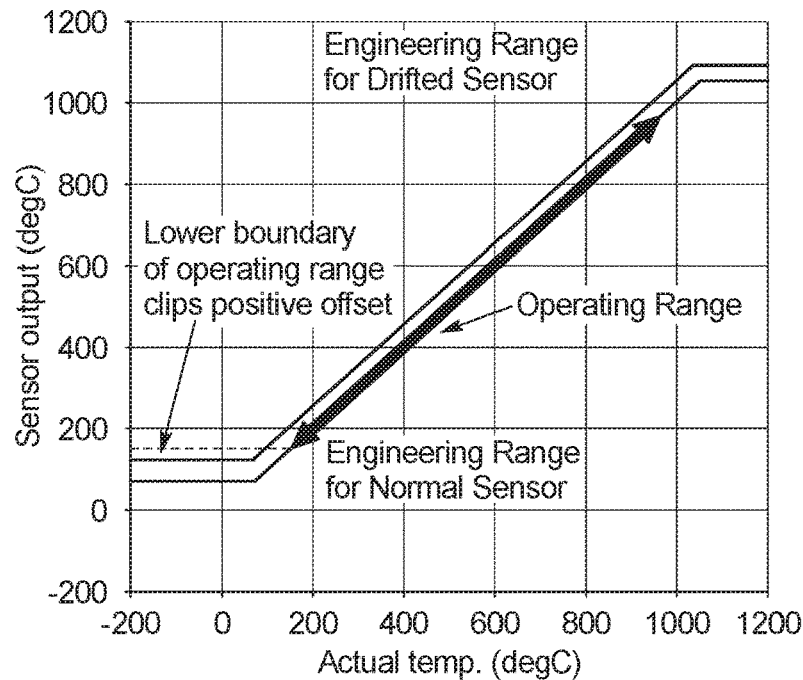
FIG. 5 is graph illustrating the clipping setting of at a lower boundary operating range.
Figure 6:
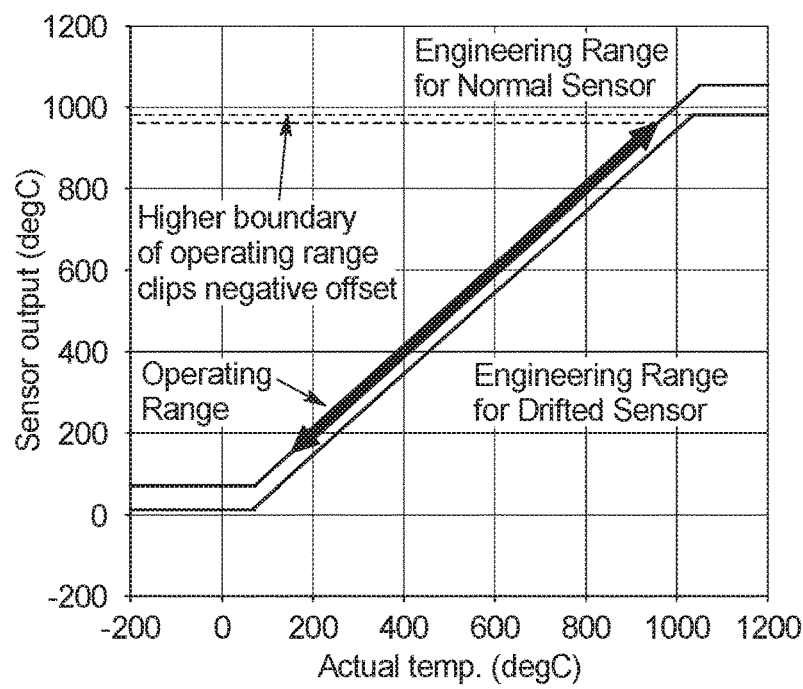
FIG. 6 is graph illustrating the clipping setting of at an upper boundary operating range.

As shown in FIGS. 5 and 6, when the sensor output has drifted for a full range sensor (a full range temperature sensor means the sensing range of the sensor covers the whole temperature range that the sensor could be), the controller 14 can be programmed to determine the difference between exhaust gas temperature sensor reading (output) relative to other available temperature sensors with filtering and averaging strategies between the other sensors. The controller 14 can then be programmed to determine the raw offset calculation for a two-sided check. That is, the controller 14 can determine the offset calculation for both the upper boundary of the operating range negative offset and the lower boundary of the operating range positive offset. The controller 14 can then be programmed to clip the raw offset at the boundary of operating range of the sensor, ensuring the stability of the self-correction.

For partial range sensor (a partial range sensor means the sensing range of the sensor covers only part of temperature range that the sensor could be), the controller 14 can be programmed to determine the difference between exhaust gas temperature sensor reading at lower cutoff of the sensor, realizing a single-sided check. The controller 14 can then be programmed to clip the raw offset at the boundary of operating range of the sensor, ensuring stability of the self-correction.

Figure 7A:
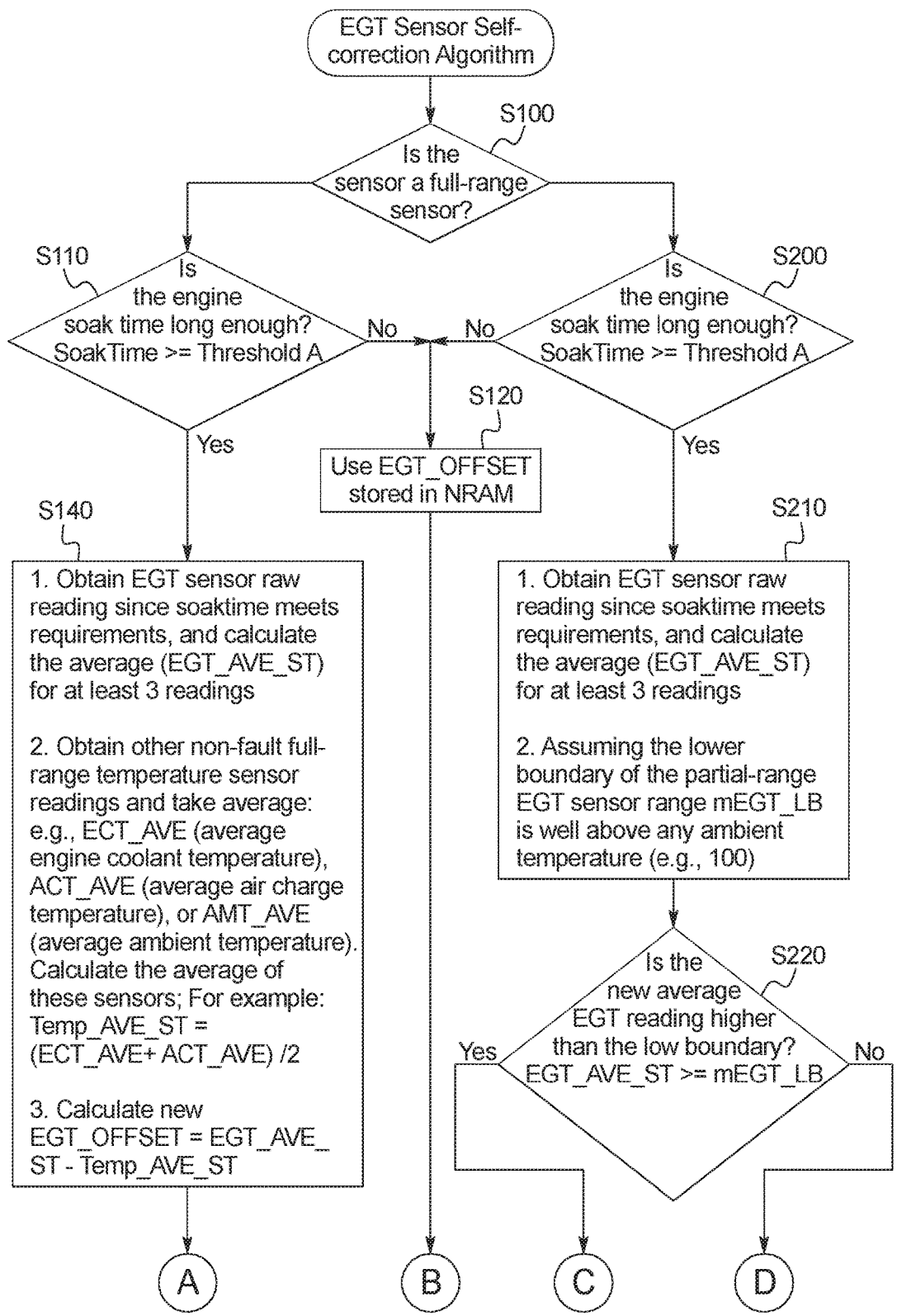
FIGS. 7A and 7B are a flow chart illustrating the algorithm for self-correction of the exhaust gas temperature sensor.
Figure 7B:
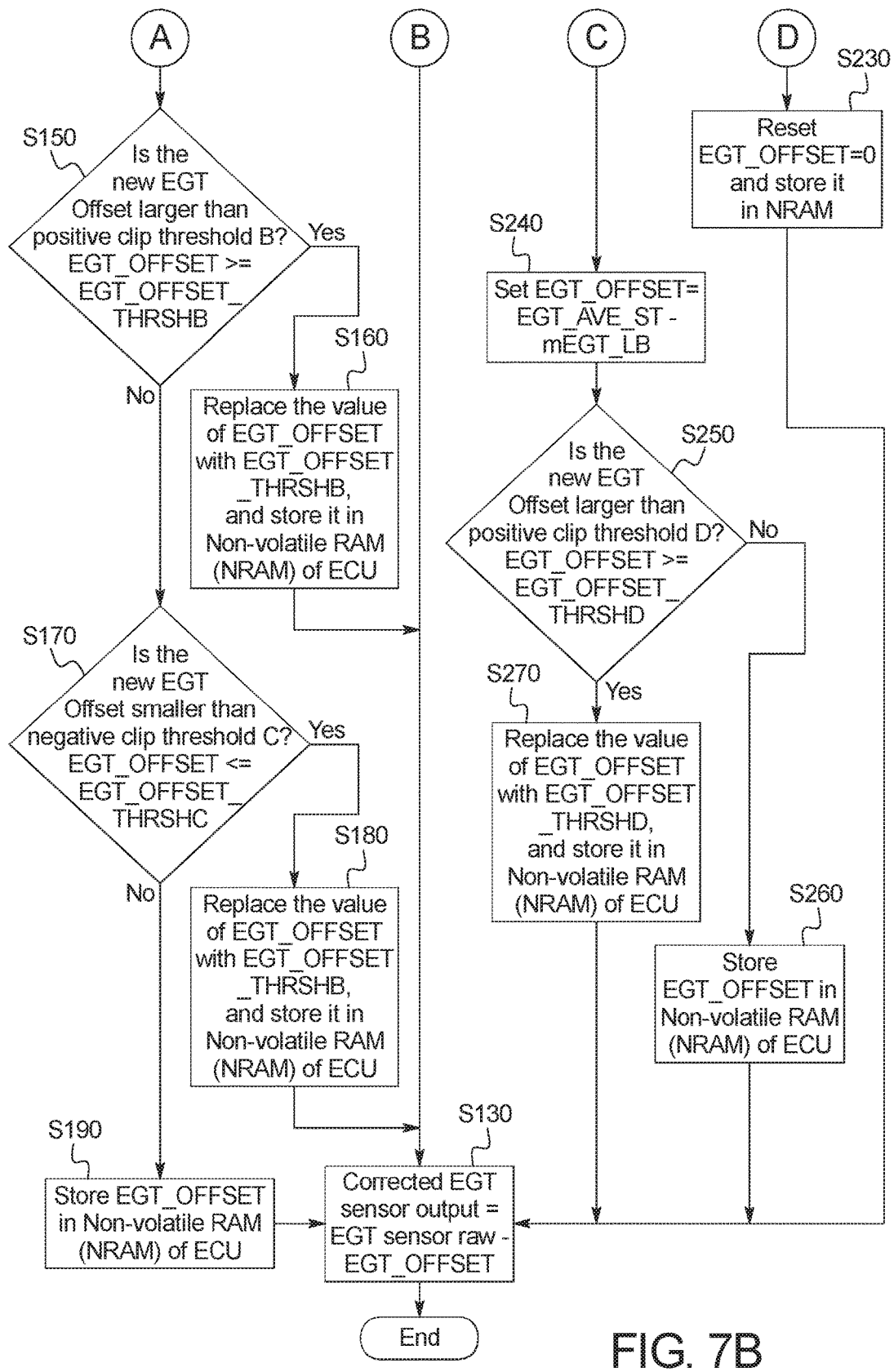

Turning to FIGS. 7A and 7B, a flow chart illustrates the exhaust gas temperature sensor system 10 self-correction algorithm. In step S100, the controller 14 can be programmed to determine whether the exhaust gas temperature sensor 12 is a full range sensor. If the exhaust gas temperature sensor 12 is a full range sensor, the controller 14 can be programmed to determine the engine soak time in step S110. That is, whether the engine soak time is equal to or greater than a predetermined threshold (threshold A). If the engine soak time is less than the predetermined threshold (threshold A), the controller 14 can be programmed to use the exhaust gas temperature sensor offset (EGT_offset) that is stored in the Non-volatile RAM (NVRAM) in step S120. The controller 14 can be programmed to then set the corrected exhaust gas temperature (EGT) sensor output to the exhaust gas temperature (EGT) sensor raw sensor reading minus the exhaust gas temperature sensor offset (EGT_offset) that is stored in the NVRAM in step S130, and stores the corrected exhaust gas temperature sensor output in the NVRAM (i.e., a storage device 16).

Turning back to step S110, if the engine soak time is equal to or greater than a predetermined threshold, (threshold A) the controller 14 can be programmed to obtain a plurality of exhaust gas temperature sensor 12 raw readings (preferably three) in step S140. It is noted that the controller 14 can be programmed to obtain any number of exhaust gas temperature (EGT) sensor readings (including only one reading). The controller 14 can then be programmed to average the plurality of exhaust gas temperature sensor raw readings (EGT_ave_st). The controller 14 can be programmed to then obtain additional non-fault full range temperature sensor readings (or value) and take an average. The controller 14 can be programmed to take the non-fault full range temperature sensor readings (or value) from any suitable secondary sensor source (i.e., a comparative temperature value), such as the engine coolant temperature (or average engine coolant temperature (ECT_ave)), the air charge temperature (or average air charge temperature (ACT_ave)), and the ambient temperature (or average ambient temperature (AMT_ave)), or any other source or combination of sources. The controller 14 can be programmed to calculate the average of these sensors or any part or combination of sensors (e.g., temp_ave_st=(ECT_ave+Act_ave)/2). The controller 14 can be programmed to then calculate an exhaust gas temperature offset (offset difference) by subtracting the average of the plurality of exhaust gas temperature sensor raw readings (or the single exhaust gas temperature sensor raw reading) and the average of the non-fault full range temperature sensor readings (EGT_offset=EGT_ave−Temp_ave_st).

The controller 14 is programmed to determine whether the exhaust gas temperature (EGT) offset is larger than or equal to a positive clip threshold (threshold B) in step S150 (i.e., EGT_offset>=EGT_offset_thrshB). If the exhaust gas temperature offset is larger than or equal to the positive clip threshold (threshold B), in step S160 the controller 14 is programmed to replace the exhaust gas temperature offset (EGT_offset) stored in the NVRAM with the positive clip threshold (threshold B), and store the positive clip threshold (threshold B), in the NVRAM in the storage device 16, or any other storage device. The controller 14 can be programmed to then set the corrected exhaust gas temperature (EGT) sensor output to the exhaust gas temperature sensor raw sensor reading minus the positive clip threshold (threshold B), that is stored in the NVRAM in step S160, and stores the corrected exhaust gas temperature sensor output in the NVRAM (i.e., a storage device 16).

If the exhaust gas temperature (EGT) offset is less than the positive clip threshold (threshold B), the controller 14 is programmed to determine whether the exhaust gas temperature (EGT) offset is less than or equal to a negative clip threshold (threshold C) in step S170 (i.e., EGT_offset<=EGT_offset_thrshC). If the exhaust gas temperature (EGT) offset is less than or equal to the negative clip threshold (threshold C), in step S180 the controller 14 is programmed to replace the exhaust gas temperature (EGT) offset stored in the NVRAM with the negative clip threshold (threshold C), and store the negative clip threshold (threshold C) in the NVRAM in the storage device 16. The controller 14 can be programmed to then set the corrected exhaust gas temperature (EGT) sensor output to the exhaust gas temperature sensor raw sensor reading minus the negative clip threshold (threshold C) that is stored in the NVRAM in step S180, and stores the corrected exhaust gas temperature sensor output in the NVRAM (i.e., a storage device 16).

If the exhaust gas temperature offset is greater than the negative clip threshold (threshold C), the controller 14 is programmed to store the exhaust gas temperature ECT) offset in the NVRAM is step S190, and determine a corrected exhaust gas temperature (EGT) output by subtracting the exhaust gas temperature (EGT) offset from the exhaust gas temperature (EGT) raw reading in step S190 and store the corrected exhaust gas temperature output in the NVRAM.

Turning back to step S100, if the exhaust gas temperature sensor 12 is a partial range sensor, the controller 14 can be programmed to determine the engine soak time in step S200. That is, whether the engine soak time is equal to or greater than a predetermined threshold (threshold A). If the engine soak time is less than the predetermined threshold (threshold A), the controller 14 can be programmed to use the exhaust gas temperature sensor offset (EGT_offset) that is stored in the Non-volatile RAM (NVRAM) in step S120. The controller 14 can be programmed to then set the corrected exhaust gas temperature (EGT) sensor output to the exhaust gas temperature sensor raw sensor reading minus the exhaust gas temperature sensor (EGT) offset that is stored in the NVRAM in step S120, and stores the corrected exhaust gas temperature sensor output in the NVRAM (e.g., storage device 16).

Turning back to step S200, if the engine soak time is equal to or greater than the predetermined threshold (threshold A), the controller 14 obtains a plurality of exhaust gas temperature sensor raw readings (preferably three readings) in step S210. It is noted that the controller 14 can be programmed to obtain any number of exhaust gas temperature sensor readings (including only one reading). The controller 14 can be programmed to then average the plurality of exhaust gas temperature sensor raw readings (EGT_ave_st). Moreover, in partial range exhaust gas temperature (EGT) sensors the lower boundary (mEGT_lb) is generally assumed to be (well) above the ambient temperatures (e.g., 100 degrees C.)

In step S220, the controller 14 is programmed to determine whether the average of the plurality of exhaust gas temperature sensor raw readings (or single exhaust gas temperature sensor raw reading) is greater than or equal to the low boundary of the exhaust gas temperature sensor 12 (EGT_ave_st>=mEGT_lb). If the average of the plurality of exhaust gas temperature sensor raw readings (or single exhaust gas temperature sensor raw reading) is not greater than or equal to (i.e., is lower than) the low boundary (mEGT_lb) of the exhaust gas temperature sensor 12, the controller 14 is programmed to reset the exhaust gas temperature offset to zero (EGT_offset=0) and store the exhaust gas temperature offset in the NVRAM is step S230.

The controller 14 then sets the corrected exhaust gas temperature (EGT) sensor output to the exhaust gas temperature (EGT) sensor raw sensor reading minus the exhaust gas temperature sensor offset (EGToffset=0) that is stored in the NVRAM in step S230, and stores the corrected exhaust gas temperature sensor output in the NVRAM (e.g., storage device 16).

If the controller 14 determines that the average of the plurality of exhaust gas temperature sensor raw readings (or single exhaust gas temperature sensor raw reading) is greater than or equal to the low boundary (mEGT_lb) of the exhaust gas temperature sensor 12, the controller 14 is programmed to determine the exhaust gas temperature sensor (EGT) offset by subtracting the average of the plurality of exhaust gas temperature sensor raw readings by the lower boundary (mEGT_lb) of the exhaust gas temperature sensor 12 in step S240 (EGT_offset=EGT_ave_st-mEGT_lb). In step S250, the controller 14 is programmed to determine whether the exhaust gas temperature (EGT) offset is greater than or equal to a predetermined offset threshold (threshold D) (EGT_offset>=EGT_offset_thrshD). If the exhaust gas temperature offset is not greater than or equal to (i.e., less than) the predetermined offset threshold (threshold D), the controller 14 is programmed to store the exhaust gas temperature (EGT) offset in the NVRAM is step S260, and determine a corrected exhaust gas temperature (EGT) output by subtracting the exhaust gas temperature offset from the exhaust gas temperature raw reading in step S260 and store the corrected exhaust gas temperature output in the NVRAM.

If the exhaust gas temperature (EGT) offset is greater than or equal to a predetermined offset threshold (threshold D), the controller 14 is programmed to replace the exhaust gas temperature (EGT) offset stored in the NVRAM with the threshold (threshold D), and store the threshold (threshold D) in the NVRAM in the storage device 16 in step S270. The controller 14 is then programmed to determine a corrected exhaust gas temperature (EGT) output by subtracting the exhaust gas temperature offset from the exhaust gas temperature raw reading in step S270 and store the corrected exhaust gas temperature output in the NVRAM.

Figure 8:
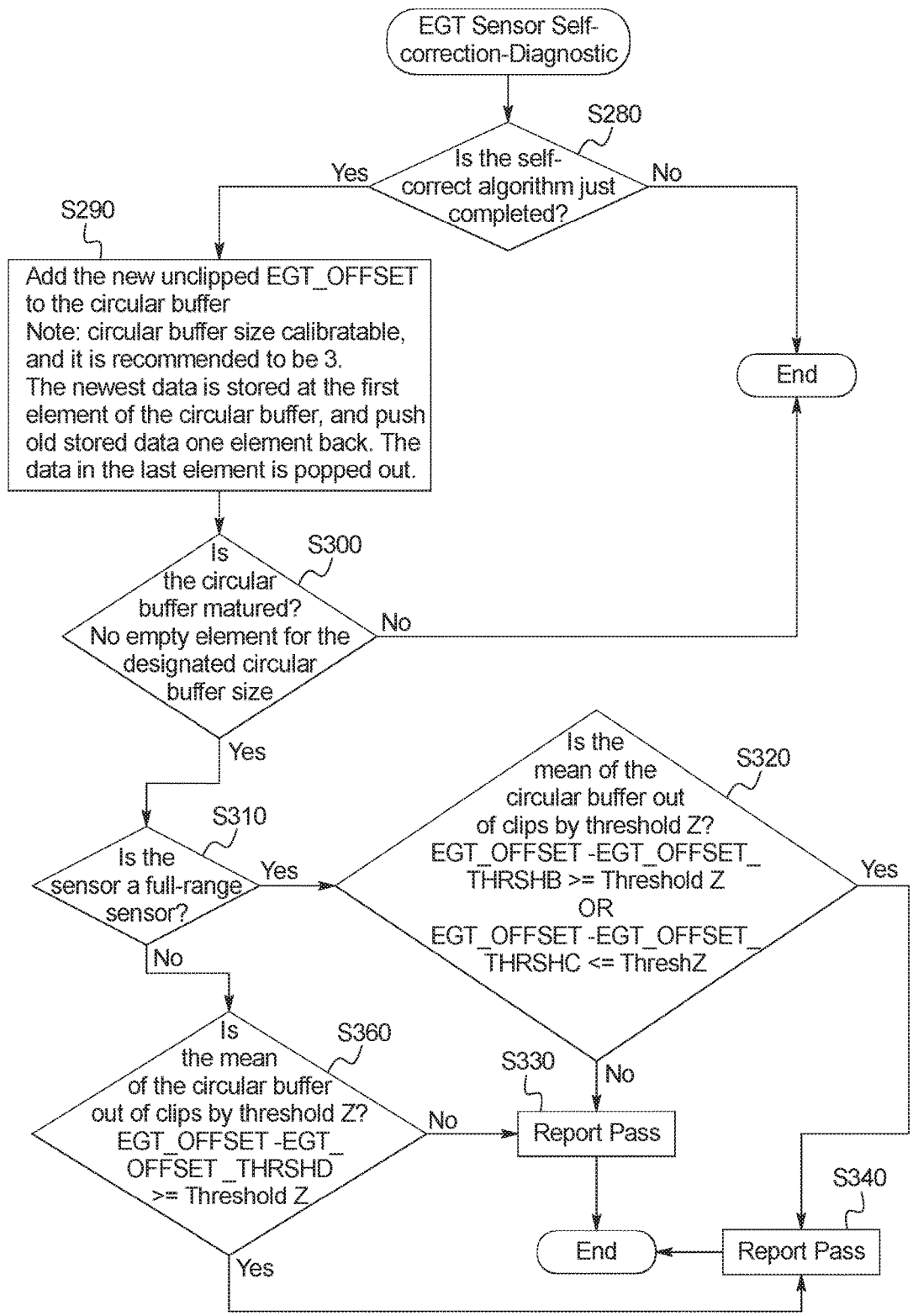
FIG. 8 is a flow chart illustrating the algorithm for a self-correction diagnostic.

FIG. 8 illustrates an exhaust gas temperature sensor self-correction diagnostic. In step S280, the controller 14 is programmed to determine whether the self-correction algorithm has been completed. If the self-correction algorithm has not been completed, the exhaust gas temperature sensor self-correction diagnostic ends. However, if self-correction algorithm has not been completed, the controller 14 is programmed to add the unclipped exhaust gas temperature offset (EGT_offset) to a circular buffer in step S290. Preferably, the circular buffer size calibratable, and can be 3 or any suitable size. The newest data (i.e., the newest unclipped exhaust gas temperature offset) is set as the first element, and the older stored data is pushed one element back, with the last data element being popped out.

In step S300, the controller 14 is programmed to determine whether the circular buffer has matured. That is, the controller 14 is programmed to determine whether there is no empty element for the designated buffer size. If the circular buffer has matured. If the circular buffer has not matured, the exhaust gas temperature sensor self-correction diagnostic ends. However, if the circular buffer has matured, the controller 14 is programmed to determine whether the exhaust gas temperature sensor 12 is a full range sensor in step S310.

If the exhaust gas temperature sensor 12 is a full range sensor, the controller 14 is programmed to determine whether the exhaust gas temperature offset (EGT_offset) minus the positive clip threshold (threshold B) is greater than or equal to a predetermined threshold (threshold Z) or whether the exhaust gas temperature offset (EGT_offset) minus the negative clip threshold (threshold C) is less than or equal to the predetermined threshold (threshold Z) in step S320 (i.e., EGT_offset−EGT_offset_thresholdB>=threshold Z OR EGT_offset−EGT_offset_thresholdC<=threshold Z). If the neither the exhaust gas temperature offset minus the positive clip threshold (threshold B) is greater than or equal to the predetermined threshold (threshold Z) or the exhaust gas temperature offset minus the negative clip threshold (threshold C) is less than or equal to the predetermined threshold (threshold Z), the exhaust gas temperature sensor system 10 reports a diagnostic pass in step S330. However, if either the exhaust gas temperature offset minus the positive clip threshold (threshold B) is greater than or equal to the predetermined threshold (threshold Z) or the exhaust gas temperature offset minus the negative clip threshold (threshold C) is less than or equal to the predetermined threshold (threshold Z), the exhaust gas temperature sensor system 10 reports a diagnostic fail in step S340.

Returning to S300 if the exhaust gas temperature sensor 12 is not a full range sensor, but a partial range sensor, the controller 14 is programmed to determine whether the exhaust gas temperature offset (EGT_offset) minus the predetermined offset threshold (threshold D) is greater than or equal to the predetermined threshold (threshold Z) in step S360 (i.e., EGT_offset-offset_thrshD>=thrshZ). If the exhaust gas temperature offset minus the predetermined offset threshold (threshold D) is not greater than or equal to the predetermined threshold (threshold Z), the exhaust gas temperature sensor system 10 reports a diagnostic fail in step S340. If the exhaust gas temperature offset minus the predetermined offset (threshold D) threshold is greater than or equal to the predetermined threshold (threshold Z), the exhaust gas temperature sensor system 10 reports a diagnostic pass in step S330.

In one embodiment of the present invention, the exhaust gas temperature sensor system 10 determines the exhaust gas temperature sensor 12 long-term drift when the controller 14 is at work up, and the engine has not run yet. For different configurations of powertrain, the self-correct algorithm could be run in different powertrain states. For example, in vehicles having engines that are completely turned off while driving (e.g., hybrid electric vehicles or plug-in hybrid electric vehicles), the exhaust gas temperature sensor system 10 can run as long as the engine soak time exceeds a predetermined time, and exhaust gas temperature sensor system 10 is powered on, and the engine is NOT running. In some embodiments, the vehicle does not necessarily need to be shut down, and could be moving and/or driven by alternative power source.

In some embodiments, for vehicles having an electronic control unit and selected sensors (including exhaust gas temperature sensor 12) that are capable of being woken up after the vehicle is shut down, the electronic control unit can be woken up, along with the desired sensors when the engine soak time reaches a predetermined time, and the controller 14 can be programmed to perform self-correction procedure described herein. Additionally, the exhaust gas temperature sensor system 10 can run the self-correction algorithm immediately after key-on or system wake up and before the engine cranks. Typically, there are at least 5 seconds from the opening of the driver door to engine ignition. Such a time can be utilized to execute the self-correct algorithm for EGT sensor.

The self-correction algorithm in the exhaust gas temperature sensor system 10 can rely on a significant engine soak time to enable the temperature of the exhaust manifold 18 to drop to the ambient temperature. The averaged exhaust gas temperature sensor reading is then compared with other available temperature sensors equipped in the vehicle. The difference of the two is the temporary offset. The temporary offset is compared to the associated offset clips. For full range sensors, there is a clip for the positive offset and a clip for negative offset. For partial range sensors, however, there only a clip for the positive offset. If the temporary offset is larger than the positive clip or smaller than the negative clip, the clip value is the final offset of the sensor for the current driving cycle. Otherwise, the temporary offset is the final offset of the sensor for the current driving cycle.

The exhaust gas temperature sensor 12, the catalyst 20 and the manifold 18 are conventional components that are well known in the art. Since exhaust gas sensor 12, the catalyst 20 and the manifold 18 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a vehicle equipped with the self-correcting exhaust gas temperature sensor system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "about" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A self-correcting exhaust gas temperature sensor system, comprising:
   an exhaust gas temperature sensor configured to be disposed in an exhaust manifold of a vehicle;
   a controller programmed to determine a reading of the exhaust gas temperature sensor at a predetermined time, determine a comparative temperature value from a secondary temperature sensor, calculate an exhaust gas temperature offset difference between the comparative temperature value and the reading of the exhaust gas temperature sensor, and based on the exhaust gas temperature offset difference relative of the comparative temperature value, replace an exhaust gas temperature sensor offset value with at least one of the exhaust gas temperature offset difference and an exhaust gas temperature offset threshold value to obtain a self-corrected exhaust gas temperature offset value; and
   a storage device configured to store at least one of the exhaust pas temperature offset difference and the exhaust gas temperature offset threshold value.

2. The system according to claim 1, wherein the controller is programmed to determine the reading of the exhaust gas temperature sensor after a predetermined soak time.

3. The system according to claim 1, wherein the controller is programmed to calculate the exhaust gas temperature offset difference between a lower boundary of a range of the secondary temperature sensor and the reading of the exhaust gas temperature sensor.

4. The system according to claim 3, wherein when the exhaust gas temperature offset difference is larger than the exhaust gas temperature offset threshold value, the controller is programmed to replace the exhaust gas temperature sensor offset value with the exhaust pas temperature offset threshold value.

5. The system according to claim 3, wherein when the exhaust gas temperature offset difference is smaller than the exhaust gas temperature offset threshold value, the controller is programmed to replace the exhaust gas temperature sensor offset value with the exhaust pas temperature offset difference.

6. The system according to claim 1, wherein the controller is programmed to calculate the exhaust gas temperature offset difference between an upper boundary of a range of the secondary temperature sensor and the reading of the exhaust gas temperature sensor.

7. The system according to claim 6, wherein when the exhaust gas temperature offset difference is larger than the exhaust pas temperature offset threshold value, the controller is programmed to replace the exhaust gas temperature sensor offset value with the exhaust gas temperature offset difference.

8. The system according to claim 6, wherein when the exhaust gas temperature offset difference is smaller than the exhaust gas temperature offset threshold value difference, the controller is programmed to replace the exhaust gas temperature sensor offset value with the exhaust gas temperature offset threshold value.

9. The system according to claim 1, wherein
   the secondary temperature sensor is one of a plurality of secondary temperature sensors, and the controller is programmed to determine a temperature reading of each of the plurality of secondary temperature sensors and average the temperature readings of the plurality of secondary temperature sensors.

10. The system according to claim 1, wherein
    the controller is programmed to determine a corrected output of the exhaust gas temperature sensor is a raw reading of the exhaust gas temperature sensor, minus the exhaust gas temperature offset difference.

11. The system according to claim 1, wherein
    the controller is programmed to determine the comparative temperature value, including determine a lower boundary of a range of the exhaust gas temperature sensor, calculate the exhaust gas temperature offset difference between the lower boundary and the reading of the exhaust gas temperature sensor and whether the exhaust gas temperature offset difference is greater than zero compare the exhaust gas temperature offset difference with the exhaust gas temperature offset threshold value.

12. The system according to claim 11, wherein the controller is programmed to replace the exhaust gas temperature sensor offset value with the exhaust gas temperature offset difference, when the exhaust pas temperature offset difference is larger than the exhaust gas temperature offset threshold value.

13. The system according to claim 11, wherein the controller is programmed to replace the exhaust gas temperature sensor offset value with the exhaust gas temperature threshold value, when the exhaust pas temperature offset difference is less than the exhaust gas temperature offset threshold value.

14. The system according to claim 11, wherein the controller is programmed to determine the reading of the exhaust gas temperature sensor after a predetermined soak time.

15. The system according to claim 11, wherein controller is programmed to determine the reading of the exhaust gas temperature sensor after a plurality of temperature readings.

16. The system according to claim 11, wherein the controller is programmed to determine a corrected output of the exhaust gas temperature sensor is a raw reading of the exhaust gas temperature sensor, minus the exhaust gas temperature offset difference.

17. The system according to claim 1, wherein the controller is programmed to compare the exhaust gas temperature offset threshold value to another exhaust gas temperature offset threshold value, and determine based on the comparison whether the exhaust gas temperature sensor is within operating limits.

* * * * *